Jan. 1, 1963    H. M. VALENTINE    3,071,393
LOAD CONTROL VALVE FOR VEHICLE AIR SPRINGS
Filed Sept. 13, 1957
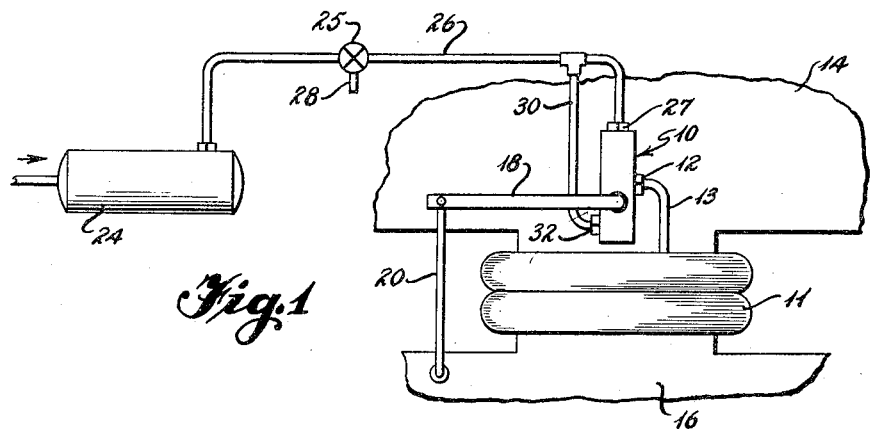
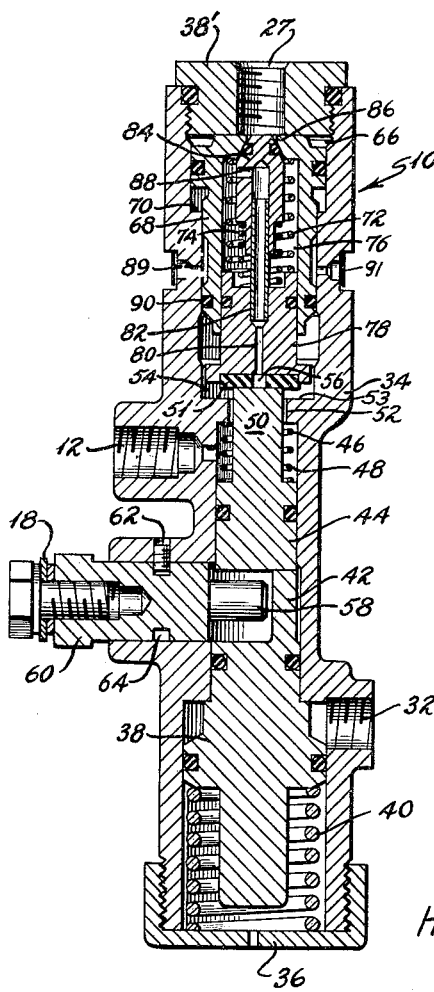
INVENTOR
*Harry M. Valentine*
BY *Scrivener and Parker*
ATTORNEYS

# United States Patent Office 3,071,393
Patented Jan. 1, 1963

3,071,393
LOAD CONTROL VALVE FOR VEHICLE
AIR SPRINGS
Harry M. Valentine, Elyria, Ohio, assignor to Bendix-Westinghouse Automotive Air Brake Company, Elyria, Ohio, a corporation of Delaware
Filed Sept. 13, 1957, Ser. No. 683,737
6 Claims. (Cl. 280—124)

This invention relates to motor vehicle air spring suspension systems and more particularly to an improved control valve mechanism for controlling the leveling action of the vehicle frame in respose to changes in load conditions.

The usual air spring suspension system utilizes a compressor, reservoir, air bellows or cushions between the axles and vehicles frame and leveling valves for controlling the volume of the bellows in accordance with vehicle loading. The leveling valve is usually carried on the frame and incorporated in the system between the bellows and reservoir and is actuated to admit or exhaust pressure to or from the bellows in response to the positioning of a lever having one end operatively connected to the valve and the other end operatively connected to the axle. As the lever oscillates about a central or neutral position in accordance with vehicle loading it connects the bellows either to reservoir pressure or to atmosphere to raise or lower the vehicle frame with respect to the axle until the desired level is restored at which point further leveling action ceases. It will be apparent that as a vehicle proceeds along a road the lever will oscillate with great rapidity about its desired level or neutral position and since it is supposed that the vehicle before moving was properly leveled, further leveling action as by rapid exhaustion and replenishment of pressure to the bellows is unnecessary and sometimes undesirable and leveling action should be restricted ton only such times as there is actually a change in vehicle loading.

One object of the present invention, therefore, is to provide a leveling valve for vehicle air springs which permits leveling action only at pre-selected times, as for example, when the vehicle is stopped and its load is changed as by the entering or leaving of passengers.

Another object of the invention is to provide a leveling valve for vehicle air springs which is activated for leveling action by fluid pressure which is admitted to the valve only at pre-selected times, as for example when the vehicle is stopped and is deactivated at other times by the exhaustion of the activating pressure so as to trap all pressure in the springs until such time as leveling action is desired.

A still further object of the invention is to provide in a valve which accomplishes the foregoing objects a means for disconnecting the operative connection between the lever and the valve until such time as leveling is desired in order to minimize wear on the valve in its inactive condition because of the rapid oscillation of the lever as the vehicle travels over a road.

Other objects and their attendant advantages will become apparent as the following detailed description is read in conjunction with the accompanying drawings wherein:

FIG. 1 is a diagrammatic view of the control valve mechanism of the invention associated with an air spring of conventional construction; and FIG. 2 is a vertical cross-sectional view of the valve of the invention.

Referring more particularly to FIG. 1, the novel control valve mechanism 10 of the present invention is illustrated therein in association with a conventional type of air spring or bellows 11 to which the valve is connected by a port 12 and a conduit 13. The valve mechanism 10 is mounted on a portion 14 of the vehicle frame with the air spring being interposed between the frame portion 14 and an axle portion 16. The control valve 10 controls the flow of compressed air to and from the air spring 11 in accordance with variations in the distance between the frame portion 14 and the axle portion 16, operation of the valve being effected by oscillation of a control lever 18, the outer end of which is connected with the axle portion 16 by means of a link 20. It will be understood that the valve mechanism 10 may be used to control air springs on opposite sides of the vehicle or separate control valve mechanisms may be utilized for each air spring if desired.

As will become more fully apparent hereinafter, the valve 10 is conditioned or activated for leveling action at predetermined times, as for example when the vehicle is stopped and a door is opened. In accordance with the invention, the valve is conditioned for leveling action by the admission of fluid pressure thereto from a reservoir 24 whose pressure also serves to load the air springs when the vehicle frame is below its desired level with respect to the axle. When activating pressure is exhausted from the valve 10 the pressure in the springs 12 is trapped and no further leveling action can take place until such time as the leveling valve is again charged. In order to admit or exhaust activating pressure to the valve 10, an auxiliary valve 25 is provided in the line 26 which connects the reservoir 24 to a port 27 at the upper end of the valve 10. The valve 25 may be of the conventional three-way type and is mechanically or electrically responsive to the condition of the vehicle, as for example to the opening of a door or the depression of the accelerator pedal, to either connect the valve 10 to reservoir 24 or to disconnect the reservoir and connect the valve to atmosphere through an exhaust port 28 in the auxiliary valve 25.

It will be observed in FIG. 1 that line 26 is provided with a branch line 30 which is connected to a port 32 at the lower end of the valve 10. As will become fully apparent hereinafter, when activating pressure is admitted to the port 27 at the upper end of valve 10 it also flows to the port 32 at the lower end of the valve where it acts on mechanism, later described in detail, which serves to operatively connect the lever 18 with the valving mechanism of valve 10. When the pressure is exhausted from the valve 10, the operative connection is disconnected from the valving mechanism so that road action on lever 18 will not cause excessive wear of the valve parts.

Referring now to FIG. 2, the valve 10 of the invention comprises a unitary casing or housing 34 whose lower end is closed by a cap member 36 and whose upper end is interiorly threaded to receive a cap member 38' which is centrally apertured to provide the aforementioned port 27. Contained within the lower end of the casing 34 is a piston 38 whose upper side is connected to the port 32 and whose lower side has acting thereagainst a spring 40 which urges the piston to its normal or no-air position of the drawing. The upper end of the piston 38 is provided with an upstanding abutment 42 which, with the piston in the position shown, bears on a plunger 44 to move it upwardly against the pressure of a spring 46 contained in a cavity 48 which is connected to the air spring 11 by way of the aforementioned port 12. The plunger 44 has an upstanding central portion 50 which engages a combined exhaust and inlet valve 51 through an opening 52 in the casing 34. The opening 52 is slightly larger than the upstanding portion 50 of the plunger so that restricted communication is provided between the cavity 48 and either an outer exhaust passage or cavity 54 or a central inlet aperture 56 through the valve 51 depending on whether the upper end of plunger portion 50 is above or below the upper edge of the opening 52 as will become more fully apparent hereinafter.

The piston 38 serves to disconnect the operative connection between the lever 18 and the mechanism of the valve 10 when it is in its deactivated condition, that is to say, when activating pressure has been exhausted by the auxiliary valve 25 as above described. When pressure is admitted to the valve 10, pressure entering port 32 acts on piston 38 to move it downwardly against its spring 40 so that the lower end of plunger 44, through the action of its spring 46, may then engage a cam 58 integrally connected through a bearing member 60 with the lever 18. The bearing member 60 may be retained in place by means of a set screw 62 engaged in a circumferential groove 64 to permit free oscillation of the bearing member and cam 58. When plunger 44 is moved downwardly by admission of charging air to port 32, the plunger is then operatively connected to the lever 18 through the cam 58 but when the pressure is exhausted through port 32 the piston 38 is moved upwardly to the position shown by the action of spring 40, causing abutment 42 to engage the lower end of plunger 44 moving it clear of cam 58 so that as this oscillates through normal road action, it does not frictionally engage plunger 44 thus eliminating wear that would naturally follow were the plunger and cam to be at all times engaged. However, as will become apparent, with but slight modifications, the piston 38 could be eliminated entirely and the plunger 44 could at all times ride on cam 58 without in any way affecting the leveling operation of the valve.

As has been mentioned before, the valve 10 is conditioned for leveling operation by the admission of fluid pressure to the upper port 27 in the casing 34. This port is connected to an inlet cavity 66 containing a shouldered piston 68 which upon receipt of pressure on its upper side is moved downwardly into engagement with a stop 70 against the combined pressures of an outer spring 72 and an inner spring 74 which are contained in a cavity 76 within piston 68. The lower ends of these springs bear on the upper end of a plunger 78 which is slideably received in cavity 76 and whose lower end carries the combined inlet and exhaust valve 51. The plunger 78 is centrally drilled to provide a passage 80 whose lower end is in axial alignment with the aforesaid central aperture 56 through the valve 51 and whose upper end is enlarged to receive a tubular member 82 which extends above the plunger 78 and slidingly receives an axial bore of a check valve member 84 which is urged by spring 74 to its normal position of the drawing where it closes a port 86 in the upper end of piston 68 which serves to connect the cavity 66 above said piston with the cavity 76 on the interior of the piston. The valve 84 is opened to admit pressure to cavity 76 by means of the pressure in cavity 66 which acts on the exposed upper end of the valve. When valve 84 is opened, pressure entering cavity 76 is admitted through a port 88 in valve 84 to tube 82 and passage 80 where, when the upper portion 50 of plunger 44 is above an abutment 53, further passage of air is blocked by engagement of portion 50 with the aperture 56 in valve 51; but when the portion 50 is below abutment 53, fluid in passage 80 may then pass through the aperture 56 in valve 51, and thence through the opening 52, cavity 48, and port 12 to the air spring 11.

From the foregoing it will be apparent that when the valve member 51 is seated against the abutment 53, fluid pressure cannot escape to the exhaust passage 54. However, when the valve 51 is moved off the abutment 53 so that inlet pressure through passage 80 is blocked by portion 50, the exhaust cavity 54 is then connected to cavity 48 and hence to air spring 11 through opening 52 and port 12. In the no-air position of the piston 68, escape of fluid pressure from exhaust cavity 54 to exhaust ports 89 through the side of the casing 34 is blocked by engagement of an O-ring valve 90 about the lower end of piston 68 which sealingly engages the inner wall of casing 34 below the ports 89. When the valve 10 is activated by admission of pressure through port 27 to cavity 66 so that the piston is moved downwardly, the O-ring 90 moves into the exhaust cavity 54 out of engagement with casing 34 so that cavity 54 is connected to the exhaust ports 89. When this condition prevails it will be apparent that when portion 50 of plunger 44 moves valve 51 off the abutment 53, the air spring 11 will then be connected with atmosphere through port 12, cavity 48, opening 52, cavity 54 and exhaust port 89. An annular resilient dust shield 91 may be provided for the exhaust ports 89.

In operation, it will be assumed that the auxiliary valve 25 operates only on door opening to connect reservoir 24 with valve 10 and that initially the vehicle is leveled. Thus when the vehicle stops and the door is opened fluid pressure is immediately admitted to the ports 27 and 32 of the valve 10. Upon this occurrence, the piston 38 moves downwardly against its spring so that plunger 44 can frictionally engage cam 58. Simultaneously, piston 68 moves downwardly against its stop 70 and O-ring valve 90 is opened to connect exhaust cavity 54 to exhaust ports 89. Since the vehicle is assumed to be initially leveled with the lever 18 in its neutral position, the valve 51 will be in lapped condition; that is, just seated on the abutment 53 to close the exhaust and with portion 50 of plunger 44 just bearing against the valve member 51 to close the inlet aperture 56. Now assuming that a passenger leaves the vehicle, this will cause air spring 11 to expand so that lever 18 rotates counterclockwise in FIG. 1 which causes the cam 58 to act on plunger 44 to move it and thus valve member 51 upwardly above the abutment 53. Relative upward movement of valve 51 with respect to piston 68 is permitted by compression of the springs 72 and 74 bearing on plunger member 78 and with the valve 51 in its upper position the air spring 11 is then open to exhaust ports 89 through port 12, cavity 48, opening 52 and exhaust cavity 54. As the pressure in the spring is reduced, the vehicle frame descends until lever 18 has rotated cam 58 to a position where plunger 44 is sufficiently lowered so that valve 51 closes the opening 52 and thus shuts off the connection between the air spring 11 and exhaust. Once this occurs further downward movement by exhaustion of the springs is not possible and hence the valve laps and neither exhausts nor admits pressure to the air springs.

Should an additional passenger now get in the vehicle, the air springs will be overloaded rotating lever 18 clockwise thus allowing plunger 50 to move away from the inlet aperture 56 so that pressure is admitted to the spring from cavity 66 via port 86, valve 84, port 56, opening 52, cavity 48 and port 12, whereupon the air spring expands until the lever is again brought back to its neutral position and the parts of the valve assume a lapped condition.

Now assume that the vehicle door is closed and the valve 25 is moved to cut off the connection between reservoir 24 and valve 10 and connect the latter to the exhaust connection 28. When this occurs, air is at once exhausted from above piston 38 causing its spring 40 to move portion 42 into engagement with plunger 44 thus moving the latter out of frictional engagement with cam 58. Simultaneously, air is exhausted from cavity 66 thus permitting piston 68 to move to the position of the drawing. Since all opening pressure is now removed from valve 84 in the piston 68, valve 84 closes and is retained closed by its spring 74 as well as by any pressure which may be trapped in cavity 76 thus positively preventing any backflow of pressure from the air spring through the inlet line to atmosphere. Since piston 68 is now in its upper position, O-ring valve 90 is engaged with the wall of casing 34 thus closing the connection between the exhaust cavity 54 and exhaust ports 89 so that the pressure in the springs would then be trapped so that no leveling action is possible until such time as the valve 10 is activated by the admission of air to cavity 66 to move the piston 68 to its down position.

It will be observed from the foregoing that when the valve 10 is deactivated, the exhaust cavity 54 is exposed to the pressure in the air spring. This is desirable since the pressure acting on the lower end of the piston 68 helps retain it in its upper position to insure against the escape of air from the springs to atmosphere. It will also be apparent from the foregoing that the piston 38 serves as a mechanical disconnecting means and if desired the piston and branch conduit 30 could be eliminated so that the plunger at all times rides on the cam 58. Should this be the desired arrangement, it will be understood that when the valve 10 has been deactivated by connecting the port 27 to atmosphere through operation of the valve 25, displacement of the lever 18, during operation of the vehicle and consequent movement of the plunger 44 will not in any way cause any leveling action since there is in the first place no pressure available to inflate the springs (it having already been exhausted from the port 27) and in the second place the springs cannot deflate since with the piston 68 in its upper position, the O-ring valve 90 and check valve 84 positively prevent escape of air pressure to atmosphere. The springs 72 and 74 would, in the event piston 38 is eliminated, permit the plunger 44 to be continuously reciprocated by the cam due to the take-up action of the springs 72 and 74 but this would not effect leveling action for the reasons hereinset forth. Thus, with the piston 38 eliminated, the construction provides an isolation system wherein the air is trapped within the air springs whenever the valve 25 is operated to connect the port 27 to atmosphere.

From the foregoing description it will be apparent that the present invention includes in a leveling valve mechanism two independently operable valve means: one, the combined inlet and exhaust valve 51 which, when the valve mechanism is activated, operates to control the flow of air to and from the air spring in a manner substantially similar to any combined inlet and exhaust valve; and two, the O-ring valve 90 and the check valve 84 which function independently of the valve 51 to control the inlet and exhaust passages depending on the position of the piston 68, the principal function of the valves, of course, being to positively close their respective passages when the mechanism is deactivated and this the valves would do even if piston 38 were eliminated so that valve 51 is continuously reciprocated between open and closed position by road action of the cam 58.

It should be expressly understood that there is no limitation on the method of operating the auxiliary valve 25 in response to vehicle condition since this could be accomplished by any of a variety of mechanical of electropneumatic systems or linkages, which may be manually operated or responsive to any operating part of the vehicle as for example, accelerator depression or retraction, emergency brake application, door opening, etc.

It will be apparent that the invention is susceptible of various modifications and changes without however departing from the scope and spirit of the appended claims.

What is claimed is:

1. Control valve mechanism for regulating the air pressure within a vehicle air spring for maintaining the vehicle frame a predetermined distance above the vehicle axle comprising a leveling valve having a casing adapted to be mounted on the frame and having an inlet cavity and port and an exhaust cavity and port, a piston in said inlet cavity movable by the admission of fluid pressure thereto from a first position to a second position, spring means normally urging said piston to its first position, said piston having an axial passage therethrough affording a connection between said inlet cavity and said air spring, a check valve in said passage to prevent at all times the backflow of air from said spring to said inlet cavity, exhaust passage means in said casing affording a connection between said air spring and said exhaust cavity, first valve means in said casing movable independently of said piston to control the flow of air through said inlet and exhaust passages to and from said air spring in accordance with the relative movement between the frame and axle, and second valve means controlled by said piston when in its first position to disconnect said exhaust cavity from said exhaust port and controlled by said piston when in its second position to connect said exhaust cavity and said exhaust port.

2. The control valve mechanism of claim 1 wherein said first valve means is slideably mounted within the inlet passage of said piston and said spring means is interposed between the piston and the first valve means.

3. The control valve mechanism of claim 1 wherein said piston is slideably mounted within the casing and said second valve means includes a part carried by the piston and engageable with the wall of the casing when the piston is in its first position, said part being movable out of engagement with said wall and into said exhaust cavity when the piston is moved to its second position.

4. The control valve mechanism of claim 1 including a cam within the casing movable in response to the relative movement between said frame and said axle, and a plunger having one end engageable with said cam and its opposite end engageable with said first valve means to control its movement in response to movement of said cam.

5. The control valve mechanism of claim 4 which includes a spring acting on said plunger to retain it in operative engagement with said cam, a second piston in said casing movable between a first position and a second position, a spring normally urging said piston to its first position, and an abutment on said piston engageable with said plunger when said piston is in its first position to retain said plunger out of operative engagement with said cam, said piston being movable by fluid pressure to its second position so that its abutment is out of engagement with said plunger.

6. A fluid pressure system for vehicle air springs comprising a fluid pressure reservoir, a leveling valve mechanism connected between said air spring and said reservoir and an auxiliary valve connected between said reservoir and said leveling valve mechanism, said auxiliary valve being responsive to a predetermined condition of said vehicle to connect said reservoir with said leveling valve mechanism only when said condition prevails and to connect said leveling valve with atmosphere at all other times, said leveling valve mechanism comprising a casing having an inlet passage therein affording a connection between said reservoir and said air spring and an exhaust passage affording a connection between said air spring and atmosphere, a check valve in said inlet passage to prevent backflow of pressure from said spring through said inlet passage, a combined inlet and exhaust valve in said casing for controlling the opening and closing of said passages in accordance with vehicle loading, a control valve in said exhaust passage for connecting or disconnecting said passage to or from atmosphere independently of said combined inlet and exhaust valve, and a piston in said casing connected to said control valve and movable between a first de-energized position and a second energized position in response to fluid flow controlled by said auxiliary valve to or from said leveling valve mechanism, said piston in its de-energized position operating said control valve to disconnect said exhaust passage from atmosphere and in its energized position operating said control valve to connect said exhaust passage to atmosphere.

References Cited in the file of this patent

UNITED STATES PATENTS

| | | |
|---|---|---|
| 1,555,199 | Gouirand | Sept. 29, 1925 |
| 1,585,833 | Down | May 25, 1926 |
| 2,787,475 | Jackson | Apr. 2, 1957 |
| 2,820,647 | Jackson | Jan. 21, 1958 |
| 2,860,607 | Orloff | Nov. 18, 1958 |

FOREIGN PATENTS

| | | |
|---|---|---|
| 3,974 | Great Britain | Feb. 25, 1905 |